United States Patent
Fan et al.

(10) Patent No.: US 9,644,067 B2
(45) Date of Patent: May 9, 2017

(54) DISTILLED EPOXY NOVOLAC RESINS

(71) Applicant: BLUE CUBE IP LLC, Midland, MI (US)

(72) Inventors: William W. Fan, Lake Jackson, TX (US); Dennis W. Jewell, Angleton, TX (US); Stephen B. Wallace, Lake Jackson, TX (US); Travis H. Larsen, Houston, TX (US)

(73) Assignee: BLUE CUBE IP LLC, Midland, MI (US)

( * ) Notice: Subject to any disclaimer, the term of this patent is extended or adjusted under 35 U.S.C. 154(b) by 0 days.

(21) Appl. No.: 15/103,100

(22) PCT Filed: Dec. 17, 2014

(86) PCT No.: PCT/US2014/070913
§ 371 (c)(1),
(2) Date: Jun. 9, 2016

(87) PCT Pub. No.: WO2015/095364
PCT Pub. Date: Jun. 25, 2015

(65) Prior Publication Data
US 2016/0304661 A1 Oct. 20, 2016

Related U.S. Application Data

(60) Provisional application No. 61/917,646, filed on Dec. 18, 2013.

(51) Int. Cl.
*C08G 59/02* (2006.01)
*C08G 59/08* (2006.01)
*C08F 6/28* (2006.01)

(52) U.S. Cl.
CPC ........... *C08G 59/025* (2013.01); *C08G 59/08* (2013.01)

(58) Field of Classification Search
CPC .................................................... C08G 59/025
USPC ......................................................... 528/480
See application file for complete search history.

(56) References Cited

FOREIGN PATENT DOCUMENTS

| CN | 102464792 | * | 5/2012 | ............. C08G 59/00 |
| GB | 1493214 | * | 11/1977 | ............. C08G 59/00 |

* cited by examiner

*Primary Examiner* — Terressa Boykin
(74) *Attorney, Agent, or Firm* — Polsinelli PC

(57) ABSTRACT

A continuous process comprising: a) separating a starting epoxy novolac resin comprising oligomers having an average functionality of greater than 2.5 and a hydrolyzable chlorine content of less than 450 ppm with a first continuous evaporator apparatus under a vaporization temperature in the range of from 150° C. to 250° C. and an absolute pressure of from 0.05 to 1 mmHg absolute to form a first vapor fraction comprising epoxy novolac resin having more than 95 weight percent of 2-functional components and wherein the mass of the first vapor fraction is in the range of from 5 to 20 weight percent of the starting epoxy novolac resin; and a first bottom fraction comprising epoxy novolac resin having a lower weight percent of 2-functional components in comparison with the weight percent of 2-functional components of the starting epoxy novolac resin; b) recovering the first bottom fraction; and c) condensing from 95 weight percent to 99.95 weight percent of the first vapor fraction at a temperature in the range of from 50° C. to 200° C. to form a first partially condensed vapor fraction product having at least 95 weight percent of 2-functional components and having a total chlorine content of less than 900 ppm and an uncondensed vapor product comprising halogenated impurities, is disclosed.

4 Claims, 2 Drawing Sheets

DISTILLED EPOXY NOVOLAC RESINS

FIELD OF THE INVENTION

Embodiments of the present disclosure relate to epoxy novolac resins, and in particular to distilled epoxy novolac resins with reduced chlorine levels.

INTRODUCTION

There is a growing trend in the electronics industry towards the use of halogen-free materials for packaging and assembly applications. Halogen-free materials are defined by the International Electrochemical Commission (IEC) standard (IEC 61249-2-21) as materials that contain less than 900 ppm chlorine, less than 900 ppm bromine, and less than 1500 ppm total combined chlorine and bromine. This trend is in response to the enactment of environmental regulations and an increasing consumer demand for more environmentally responsible microelectronic devices. In addition to these market drivers, the reduction of halogens offers reliability performance improvements, as the presence of ionic impurities has been shown to accelerate the rate of corrosion-related failures.

Many of the materials used for electronics packaging and assembly applications contain epoxy resins as the organic binder. Traditional diglycidyl ether of bisphenol A (DGEBA) and diglycidyl ether of bisphenol F (DGEBF) resins contain greater than 1800 ppm total chlorine and contribute significantly to the total halogen content of the formulation. Therefore, in order to meet the halogen-free specification and allow formulation flexibility, there is an increasing demand for epoxy resins with reduced chlorine content.

Epoxy novolac resins and processes for their preparations are well known. These resins typically have wide oligomer distributions (or functionality) and their corresponding properties depend on the average functionality and the width of the oligomer distribution. To prepare an epoxy novolac resin having a particular average functionality, different ratios of aldehyde to phenolic hydroxyl containing compound are employed. To prepare DGEBF resins (functionality=2) in high purity, a ratio of 1:10 or higher of formaldehyde to phenol is often used leading to low reactor utilization and requiring extensive recovery of the high excess phenol.

Therefore, a process for preparing high purity 2-functional resins with low chlorine content would be desirable.

SUMMARY

The present invention relates to a process for preparing diglycidyl ether of bisphenol-F (DGEBF) resins and in particular low chlorine DGEBF resins. This invention utilizes a continuous evaporation/condensation process to produce DGEBF resins with reduced chlorine levels from an epoxy novolac resin composed of an average functionality of 3.0-4.0. Thin film evaporation devices are used to separate the starting epoxy novolac resin into its 2-functional component (DGEBF) and higher oligomer components. The DGEBF resin thus obtained has a lower chlorine content than the starting material as the distillation also partitions most of the chlorines to the higher oligomer distillation fraction. In addition, light boiling chlorinated impurities can also be purged anywhere along this process to further reduce the chlorine content in the final DGEBF resin.

In one broad embodiment of the present invention, there is disclosed a continuous process comprising, consisting of, or consisting essentially of a) separating a starting epoxy novolac resin comprising oligomers having an average functionality of greater than 2.5 and a hydrolyzable chlorine content of less than 450 ppm with a first continuous evaporator apparatus under a vaporization temperature in the range of from 150° C. to 250° C. and an absolute pressure of from 0.05 to 1 mmHg absolute to form a first vapor fraction comprising epoxy novolac resin having more than 95 weight percent of 2-functional components, wherein the mass of the first vapor fraction is in the range of from 5 to 20 weight percent of the starting epoxy novolac resin; and a first bottom fraction comprising epoxy novolac resin having a lower weight percent of 2-functional components in comparison with the weight percent of 2-functional components of the starting epoxy novolac resin; b) recovering the first bottom fraction; and c) condensing from 95 weight percent to 99.95 weight percent of the first vapor fraction at a temperature in the range of from 50° C. to 200° C. to form a first partially condensed vapor fraction product having at least 95 weight percent of 2-functional components and having a total chlorine content of less than 900 ppm and an uncondensed vapor product comprising halogenated impurities.

In another embodiment of the present invention, there is disclosed a continuous process comprising, consisting of, or consisting essentially of a) separating a starting epoxy novolac resin comprising oligomers having an average functionality of greater than 2.5 and a hydrolyzable chlorine content of less than 450 ppm with a first continuous evaporator apparatus under a vaporization temperature in the range of from 150° C. to 250° C. and an absolute pressure of from 0.05 to 1 mmHg absolute to form a first vapor fraction comprising epoxy novolac resin having more than 95 weight percent of 2-functional components and wherein the mass of the first vapor fraction is in the range of from 5 to 20 weight percent of the mass of the starting epoxy novolac resin; and a first bottom fraction comprising epoxy novolac resin having a lower weight percent of 2-functional component contents in comparison with the starting epoxy novolac resin; b) recovering the first bottom fraction; c) condensing the first vapor fraction at a temperature in the range of from 0° C. to 150° C. to form a first condensed vapor fraction; and d) separating the first condensed vapor fraction with a second continuous evaporator apparatus under a vaporation temperature in the range of from 150° C. to 250° C. and an absolute pressure in the range of from 0.05 to 1 mmHg absolute conditions to form a second vapor fraction comprising halogenated impurities having a mass in the range of from 0.05 to 5 weight percent of the mass of the first condensed vapor fraction of step c); and a second bottom fraction product having at least 95 weight percent of 2-functional components and having a total chlorine content of less than 900 ppm; and e) recovering the second bottom fraction.

DETAILED DESCRIPTION

In various embodiments, the starting material is an epoxy novolac resin. In an embodiment, the starting material comprises epoxy phenol novolac oligomers. Examples of epoxy phenol novolacs include, but are not limited to epoxy phenol novolac (EPN) and bisphenol-F epoxy resins. Furthermore, it can comprise other epoxy resins for example, bisphenol-A epoxy resins.

The general structure of an epoxy phenol novolac is shown in Formula I, below.

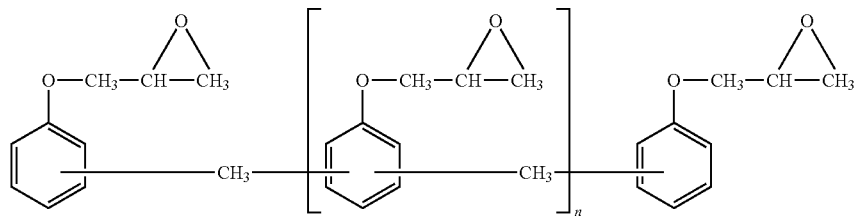

Formula I

The starting epoxy novolac resin comprises oligomers having an average functionality of greater than 2.1. In various other embodiments, the average functionality is from 2.5 to 5.0, preferably from 3.0 to 4.0, most preferably from 3.5 to 4.0. In addition, the hydrolyzable chlorine content of the starting epoxy novolac resin comprises less than 450 ppm, preferably less than 350 ppm, most preferably less than 250 ppm. The term 'chlorine' also includes any ionic chlorides that may be present. The hydrolyzable chlorine content of the starting epoxy novolac resin can be reduced by any conventional means, for example, a post treatment with caustic. Furthermore, the total chlorine content of the starting epoxy novolac resin comprises less than 1800 ppm, preferably less than 1650 ppm, most preferably less than 1500 ppm.

Figure 1:
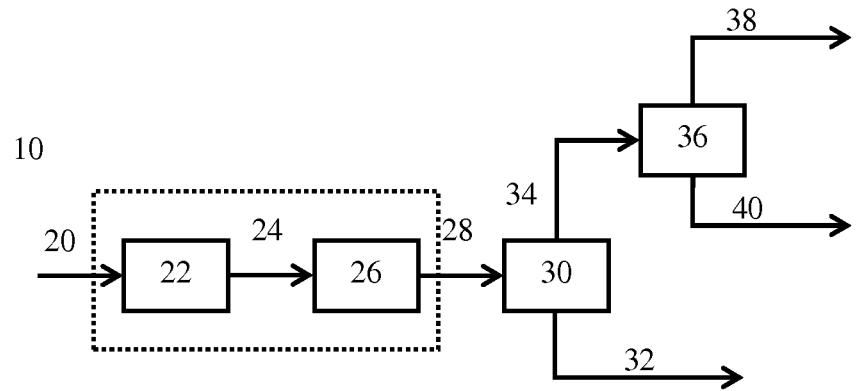
FIG. 1 depicts two evaporation/condensation systems.
Figure 1:
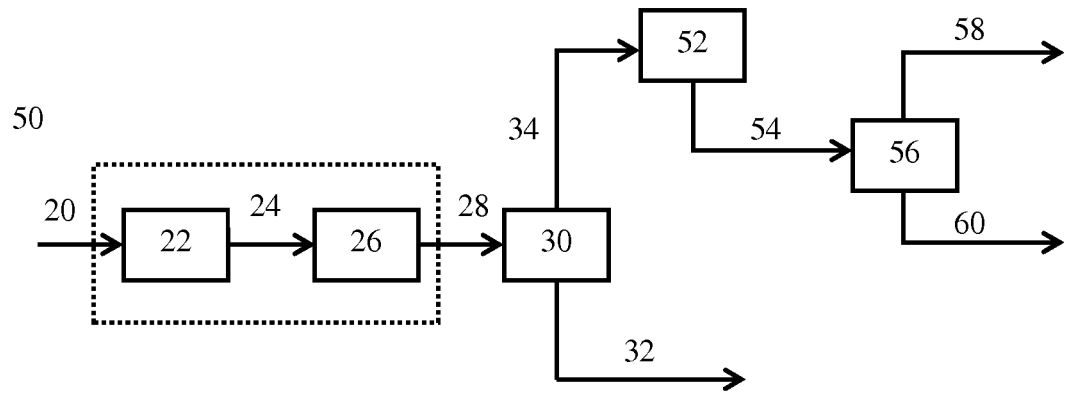

FIG. 1 represents evaporation/condensation system 10. In an embodiment, the starting epoxy novolac resin can be contacted with an optional heater 22 via conduit 20 and can also optionally be contacted with degasser 26 via conduit 24. The optional preheater can be operated at a temperature in the range of from 50° C. to 200° C. and an absolute pressure of from 0.1 to 50 mmHg. The optional degasser can be operated at a temperature in the range of from 150° C. to 250° C. and an absolute pressure of from 0.1 to 20 mmHg. The degasser can be used to remove dissolved gases and uncondensables to avoid pressure build and fluctuation in the evaporation step. Furthermore in one embodiment, the degasser can also be used to remove halogenated light boiling components from the starting epoxy novolac resin resulting in lower chlorines in the final product. These halogenated light boiling components comprises non-aromatic impurities, for example, by-product derivatives of epichlorohydrin.

The starting epoxy novolac resin is then contacted with first continuous evaporator apparatus 30 under vaporization temperature in the range of from 150° C. to 250° C. and an absolute pressure of from 0.05 to 1 mmHg absolute via conduit 28 to form a first vapor fraction comprising epoxy novolac resin having more than 95 weight percent of 2-functional components and a mass which is in the range of from 1 to 20 weight percent of the starting epoxy novolac resin, from 5 to 20 in another embodiment, and from 10 to 15 in yet another embodiment and a first bottom fraction comprising epoxy novolac resin having a lower weight percent of 2-functional components in comparison with the weight percent of 2-functional components of the starting epoxy novolac resin. The first bottom fraction is recovered via conduit 32. The first vapor fraction is then contacted with partial condenser 36 in the temperature range of from 50° C.

to 200° C. via conduit 34 to form a first condensed vapor fraction having at least 95 weight percent of 2-functional components and having a total chlorine content of less than 900 ppm, which is recovered via conduit 40, and an uncondensed vapor product comprising halogenated non-aromatic impurities, which is recovered via conduit 38. In one embodiment, the partial condenser has an exchange area in the range of from 0.1 to 0.9, preferably from 0.1 to 0.5 of the corresponding evaporator exchange area. The partial condenser should preferable designed for low pressure drop in high vacuum operation. In an embodiment, from 95 weight percent to 99.95 weight percent of the first vapor fraction is condensed in partial condenser 36.

Figure 2:
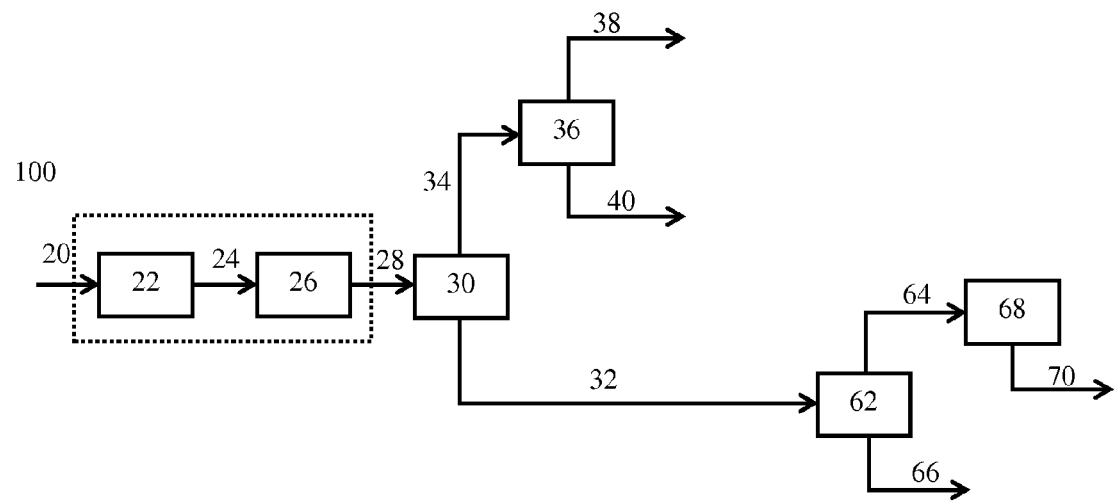
FIG. 2 depicts two evaporation/condensation systems.
Figure 2:
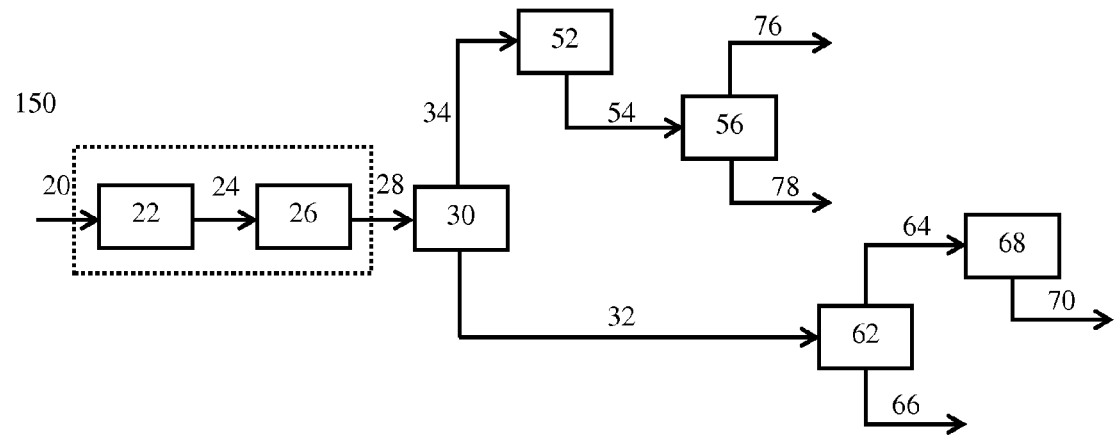

In yet another embodiment, depicted in system 100 shown in FIG. 2, the recovered first bottom fraction is contacted with continuous evaporation apparatus 62 under vaporization temperature in the range of from 150° C. to 300° C. and an absolute pressure of from 0.05 to 1 mmHg absolute via conduit 32 to form a vapor fraction comprising epoxy novolac resin having more than 75 weight percent of 2-functional components and a bottom fraction comprising epoxy novolac resin having less than 5 weight percent of 2-functional components. This low 2-functional material can be utilized as a high Tg material in composite and laminates and can be considered as a co-product to the low chlorine DGEBF with this process. The bottom fraction is recovered via conduit 66. The vapor fraction is then contacted with condenser 68 via conduit 64 to form a condensed product comprising at least 75 weight percent of 2 functional components, which is recovered via conduit 70.

Another embodiment is depicted as system 50 in FIG. 1. In this embodiment, first vapor fraction 34 is contacted with total condenser 52 in the temperature range of from 0° C. to 150° C. to form a first condensed vapor fraction 54 which is then contacted with second continuous evaporator apparatus 56 under vaporation temperature in the range of from 150° C. to 250° C. and an absolute pressure of from 0.05 to 1 mmHg absolute to form a second vapor fraction 58 comprising halogenated non-aromatic impurities having a mass in the range of from 0.05 to 5 weight percent of the mass of the first condensed vapor fraction and bottom fraction having at least 95 weight percent of 2-functional components and having a total chlorine content of less than 900 ppm, which is recovered via conduit 60. Another embodiment of system 50 is depicted in system 150 in FIG. 2. In this embodiment, the recovered first bottom fraction is contacted with continuous evaporation apparatus 62 under vaporization temperature in the range of from 150° C. to 300° C. and an absolute pressure of from 0.05 to 1 mmHg absolute via conduit 32 to form a vapor fraction comprising epoxy novolac resin having more than 75 weight percent of 2-functional components and a bottom fraction comprising epoxy novolac resin having less than 5 weight percent of 2-functional components. This low 2-functional material can be utilized as a high Tg material in composite and laminates and can be considered as a co-product to the low chlorine DGEBF with this process. The bottom fraction is recovered via conduit 66. The vapor fraction is then contacted with condenser 68 via conduit 64 to form a condensed product comprising at least 75 weight percent of 2 functional components, which is recovered via conduit 70.

In various embodiments, the feed can optionally be contacted with a heater and/or degasser before it comes in contact with any of the evaporators. In an embodiment, one or more of the continuous evaporators can comprise of low residence time and low pressure drop devices such as a thin film evaporator. Furthermore, the evaporator apparatus can comprises of an evaporator and a condenser such as a wiped film evaporator, falling film evaporator, or a short path evaporator.

The resulting products can be used in electrical laminate, electronics, coating, and composite applications.

EXAMPLES

Examples 1-11

An epoxy novolac produced from a phenol to formaldehyde ratio of 2.2:1 was used as the feed with an oligomer distribution of 3.6 functionality and a 2 functional content of 22.2%. The short path wiped film evaporation apparatus used is a 2" unit from Pope Scientific with a heating transfer area of 0.03 m² and a heating to cooling transfer area of 4:1. The pressure was set at 1 mmHg with a rpm of 130. The cold finger condenser was set at 100° C. to partially condense the overhead. Electrical heaters were used to heat the short path to the desire overhead split ratio. As can be seen, an epoxy novolac resin of less than 450 ppm hydrolyzable chlorine is needed to produce DGEBF resin with less than 900 ppm total chlorine. In addition, not all of the 2 functional material in the feed can be recovered as total chlorine increases with increasing split fraction.

Examples 12-16

An epoxy novolac produced from a phenol to formaldehyde ratio of 2.2:1 was used as the feed with an oligomer distribution of 3.6 functionality and a 2 functional content of 22.2%. The short path wiped film evaporation apparatus used is a 6" unit with a heating transfer area of 0.2 m² and a heating to cooling transfer area of 1:1. The pressure was set at 1 mmHg with a rpm of 300. The cold finger condenser was set at 50° C. A hot oil jacketed system was used to heat the short path to the desire overhead split ratio. As can be seen without partial condensing, the total chlorine content of the DGEBF remains high due to the light boiling chlorinated impurities. However, this can be remedied by performing a second evaporation pass to reduce chlorine levels. An optimal split ratio exists to achieve minimum total chlorine content.

Examples 17-21

The material from Example 12 is used as the starting feed material for a second evaporation pass to further purify the DGEBF. The short path wiped film evaporation apparatus used is a 6" unit with a heating transfer area of 0.2 m² and a heating to cooling transfer area of 1:1. The pressure was set at 1 mmHg with a rpm of 300. The cold finger condenser was set at 50° C. A hot oil jacketed system was used to heat the short path to the desire overhead split ratio. As can be seen, the total chlorine content is reduced as higher purity of DGEBF is achieved. However, light boiling chlorinated impurities are still present and can still be remedied by lights removal. An optimal split ratio still exists to achieve minimum total chlorine content.

Example 22

The material from Example 20 is further processed to remove 1.5% of the lights impurities as an overhead fraction. The chlorine level dropped by 200 ppm.

The feed and fraction compositions with chlorine contents are shown in Table 1, below.

TABLE 1

| | Feed | | Split Ratio | DGEBF Fraction | | |
|---|---|---|---|---|---|---|
| Example | Total Cl— ppm | HyCl ppm | ovh/ total wt/wt | Total Cl— ppm | HyCl ppm | Purity Wt % |
| SPE with 1:4 Condensing:heating | | | | | | |
| 1C | 2298 | 810 | 0.26 | 1434 | 845 | 84.9% |
| 2C | 2298 | 810 | 0.19 | 1142 | 653 | 94.4% |
| 3C | 2298 | 810 | 0.09 | 972 | 493 | 96.4% |
| 4 | 1800 | 442 | 0.17 | 856 | 215 | 97.6% |
| 5 | 1800 | 442 | 0.09 | 621 | 180 | 98.7% |
| 6 | 1640 | 190 | 0.12 | 582 | | 98.6% |
| 7 | 1640 | 190 | 0.09 | 524 | | 98.9% |
| 8C | 1484 | 202 | 0.26 | 1308 | 109 | 86.5% |
| 9 | 1484 | 202 | 0.19 | 885 | 80 | 96.6% |
| 10 | 1484 | 202 | 0.17 | 707 | 70 | 95.7% |
| 11 | 1484 | 202 | 0.12 | 513 | 59 | 97.6% |
| SPE with 1:1 Condensing:heating | | | | | | |
| 12C | 1640 | 190 | 0.26 | 1398 | | 87.1% |
| 13C | 1640 | 190 | 0.17 | 1061 | | 97.7% |
| 14C | 1640 | 190 | 0.12 | 1016 | | 98.6% |
| 15C | 1640 | 190 | 0.09 | 1056 | | 97.1% |
| 16C | 1640 | 190 | 0.04 | 1299 | | 98.1% |
| SPE with 1:1 Condensing:heating with 2 passes | | | | | | |
| 17C | 1640 | 190 | 0.22 | 1050 | | 98.3% |
| 18C | 1640 | 190 | 0.19 | 920 | | 98.9% |
| 19 | 1640 | 190 | 0.17 | 860 | | 98.8% |
| 20 | 1640 | 190 | 0.12 | 879 | | 99.4% |
| 21 | 1640 | 190 | 0.06 | 1157 | | 99.0% |
| SPE with 1:1 Condensing:heating with 2 passes & lights removal | | | | | | |
| 22 | 1640 | 190 | 0.02 | 644 | | 99.0% |

Analytical Methods

Chlorine Quantification

Hydrolyzable chlorine content of the liquid epoxy resins was measured according to ASTM D1726 (Test Method B). Total chlorine content was measured using a titration-based method, which has been shown to provide statistically equivalent results to the standard ASTM D4301 method.

The first step of the titration method involves dissolving 1 g of resin into 50 mL of dimethylformamide (DMF) and 5 mL of 1N KOH in ethanol solution in a round bottom flask. The flask is then attached to a water-cooled condenser, heated until the sample begins boiling, and then refluxed for 5 min. After the flask has cooled, the condenser is rinsed with approximately 20 mL of acetone, and the contents are transferred to a disposable beaker. The solution is neutralized using bromocresol green indicator and adding a 1:1 $HNO_3/H_2O$ solution dropwise until the solution changes from blue to yellow. Titration is performed using an automatic titrator with a combination silver electrode and 0.0025N AgNO₃ as the titrant.

Functionality

The functionality was determined by the GPC using a Viscotek GP Max equipped with a TDA 302 detector array which included a refractive index detector, a viscosity detector, and a RALLS (right angle laser light scattering detector). Separation was achieved using 2 PLgel 3 um mixed E, 300×7.5 mm analytical columns. Tetrahydrofuran (THF), inhibited with 250 ppm BHT was used as the mobile phase. The sample was dissolved in mobile phase (1%) and filtered. The instrument was calibrated using Viscotek 115K polystyrene standards.

The invention claimed is:

1. A continuous process comprising:
   a) separating a starting epoxy novolac resin comprising oligomers having an average functionality of greater than 2.5 and a hydrolyzable chlorine content of less than 450 ppm with a first continuous evaporator apparatus under a vaporization temperature in the range of from 150° C. to 250° C. and an absolute pressure of from 0.05 to 1 mmHg absolute to form
      i) a first vapor fraction comprising epoxy novolac resin having more than 95 weight percent of 2-functional components, wherein the mass of the first vapor fraction is in the range of from 5 to 20 weight percent of the starting epoxy novolac resin; and
      ii) a first bottom fraction comprising epoxy novolac resin having a lower weight percent of 2-functional components in comparison with the weight percent of 2-functional components of the starting epoxy novolac resin;
   b) recovering the first bottom fraction; and
   c) condensing from 95 weight percent to 99.95 weight percent of the first vapor fraction at a temperature in the range of from 50° C. to 200° C. to form
      i) a first partially condensed vapor fraction product having at least 95 weight percent of 2-functional components and having a total chlorine content of less than 900 ppm and
      ii) an uncondensed vapor product comprising halogenated impurities.

2. A continuous process comprising:
   a) separating a starting epoxy novolac resin comprising oligomers having an average functionality of greater than 2.5 and a hydrolyzable chlorine content of less than 450 ppm with a first continuous evaporator apparatus under a vaporization temperature in the range of from 150° C. to 250° C. and an absolute pressure of from 0.05 to 1 mmHg absolute to form
      i) a first vapor fraction comprising epoxy novolac resin having more than 95 weight percent of 2-functional components and wherein the mass of the first vapor fraction is in the range of from 5 to 20 weight percent of the mass of the starting epoxy novolac resin; and
      ii) a first bottom fraction comprising epoxy novolac resin having a lower weight percent of 2-functional component contents in comparison with the starting epoxy novolac resin;
   b) recovering the first bottom fraction;
   c) condensing the first vapor fraction at a temperature in the range of from 0° C. to 150° C. to form a first condensed vapor fraction; and
   d) separating the first condensed vapor fraction with a second continuous evaporator apparatus under a vaporation temperature in the range of from 150° C. to 250° C. and an absolute pressure in the range of from 0.05 to 1 mmHg absolute conditions to form
      i) a second vapor fraction comprising halogenated impurities having a mass in the range of from 0.05 to 5 weight percent of the mass of the first condensed vapor fraction of step c); and
      ii) a second bottom fraction product having at least 95 weight percent of 2-functional components and having a total chlorine content of less than 900 ppm; and
   e) recovering the second bottom fraction.

3. A process in accordance with claim 1 further comprising:
   b1) separating the first bottom fraction of step b) with a third continuous evaporator apparatus under a vaporization temperature in the range of from 150° C. to 300° C. and an absolute pressure in the range of from 0.05 to 1 mmHg absolute conditions to form
      i) a third vapor fraction comprising epoxy novolac resin having more than 75 weight percent of 2-functional components and wherein the third vapor fraction has a mass in the range of from 5 weight percent to 20 weight percent of the first bottom fraction; and
      ii) a third bottom fraction product comprising epoxy novolac resin having less than 5 weight percent of 2-functional components; and
   b2) condensing the third vapor fraction of step b1(i) at a temperature in the range of from 0° C. to 150° C. to form a second condensed product comprising at least 75 weight percent of 2 functional components
   b3) recovering the third bottom fraction product.

4. A process in accordance with claim 2 further comprising:
   b1) separating the first bottom fraction of step b) with a third continuous evaporator apparatus under a vaporization temperature in the range of from 150° C. to 300° C. and an absolute pressure in the range of from 0.05 to 1 mmHg absolute conditions to form
      i) a third vapor fraction comprising epoxy novolac resin having more than 75 weight percent of 2-functional components and wherein the third vapor fraction has a mass in the range of from 5 weight percent to 20 weight percent of the first bottom fraction; and
      ii) a third bottom fraction product comprising epoxy novolac resin having less than 5 weight percent of 2-functional components; and
   b2) condensing the third vapor fraction of step b1(i) at a temperature in the range of from 0° C. to 150° C. to form a second condensed product comprising at least 75 weight percent of 2 functional components
   b3) recovering the third bottom fraction product.

* * * * *